United States Patent [19]

Kemmner

[11] 4,428,356  
[45] Jan. 31, 1984

[54] DEVICE FOR CONTROLLING AT LEAST ONE THROTTLE DIAMETER IN A CONTROL LINE

[75] Inventor: Ulrich Kemmner, Stuttgart, Fed. Rep. of Germany

[73] Assignee: Robert Bosch GmbH, Stuttgart, Fed. Rep. of Germany

[21] Appl. No.: 421,177

[22] Filed: Sep. 22, 1982

[30] Foreign Application Priority Data

May 14, 1982 [DE] Fed. Rep. of Germany ....... 3218210

[51] Int. Cl.³ ............................................. F02M 23/04
[52] U.S. Cl. .................................... 123/585; 123/339; 123/588; 251/133
[58] Field of Search ................ 123/327, 339, 585–589; 251/133, 309, 335 A

[56] References Cited

U.S. PATENT DOCUMENTS

| | | | |
|---|---|---|---|
| 2,757,898 | 8/1956 | Cox | 251/335 A |
| 3,347,516 | 10/1967 | Linde | 251/309 |
| 3,475,003 | 10/1969 | Paluszek | 251/309 |
| 3,484,079 | 12/1969 | Reagan | 251/309 |
| 3,674,238 | 7/1972 | Pickles et al. | 251/309 |
| 3,780,985 | 12/1973 | Perry | 251/309 |
| 4,084,563 | 4/1978 | Hattori et al. | 123/586 |
| 4,215,847 | 8/1980 | Hoos | 251/309 |
| 4,388,913 | 6/1983 | Grimm et al. | 123/585 |

FOREIGN PATENT DOCUMENTS 55-51928 4/1980 Japan .................................. 123/585

Primary Examiner—William A. Cuchlinski, Jr.
Attorney, Agent, or Firm—Edwin E. Greigg

[57] ABSTRACT

A device for the control of at least one throttle diameter in a control line, especially in a line carrying fuel for an internal combustion engine, is proposed. The device includes at least one circle segment-like control section in a control bore intersecting the control line, the section pivotable around an axle and opening to a larger or lesser degree the throttle diameter formed by the intersection. The control bore has a circularly arched sealing surface surrounding the throttle diameter extending eccentrically to the axle and with which the control section, also disposed eccentrically to the axle and disposed pivotably, works together in such a way, that the radial distance between the circumference of the control section and the sealing surface is nearly zero when the control section is in a closed position, and increases during a pivotal movement in the direction of opening the throttle diameter. The radii of sealing surface and control section are of the same size and proceed from a circular arc with a radius around the center line of the axle.

7 Claims, 3 Drawing Figures

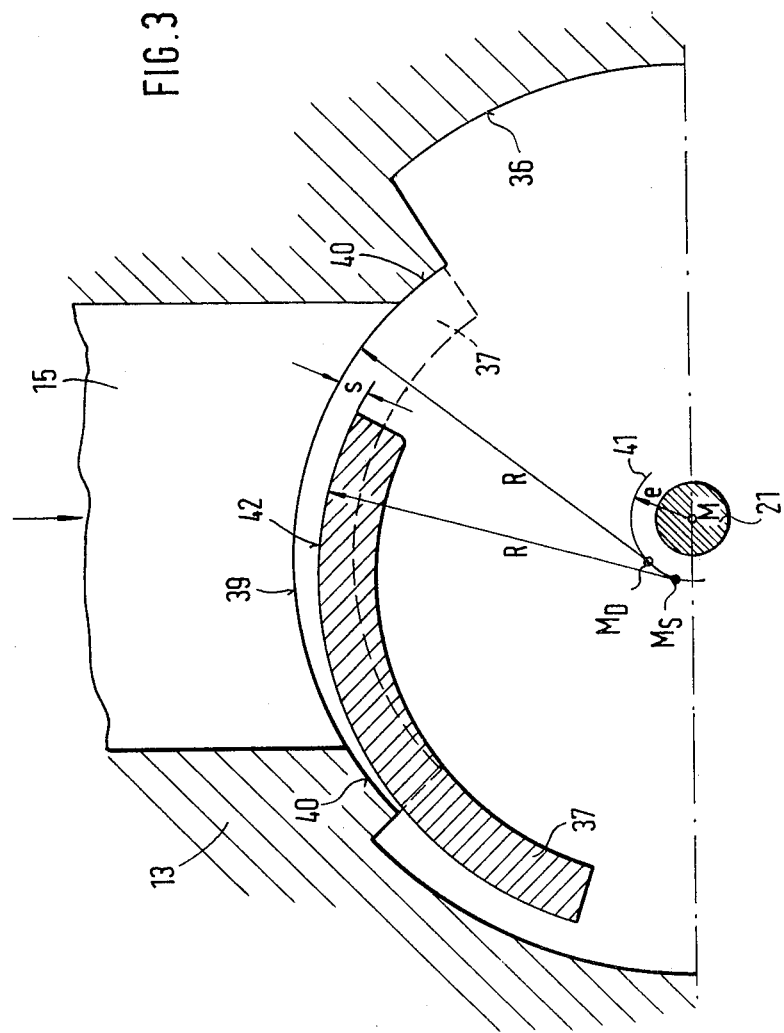

DEVICE FOR CONTROLLING AT LEAST ONE THROTTLE DIAMETER IN A CONTROL LINE

BACKGROUND OF THE INVENTION

The present invention is based on a device for the control of a throttle diameter for a line carrying fuel for an internal combustion engine. Such a device is already known which, however, has the disadvantage that because (due to reasons of production requirements and functional necessities) the radial gap is not kept sufficiently narrow or tight while in a closed condition of the device, leakage problems arise so that even in the closed state of the device an undesireable leaking flow of the fuel occurs.

OBJECT AND SUMMARY OF THE INVENTION

In contrast to the foregoing, the device in accordance with the present invention has the advantage that a flow of the fuel during the closed state of the device is rendered completely impossible, while at the same time the device is kept dirt-free by virtue of its unique construction.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 3 shows the partial view of a section along the line III—III in FIG. 2.

DESCRIPTION OF THE PREFERRED EMBODIMENT

Figure 1:
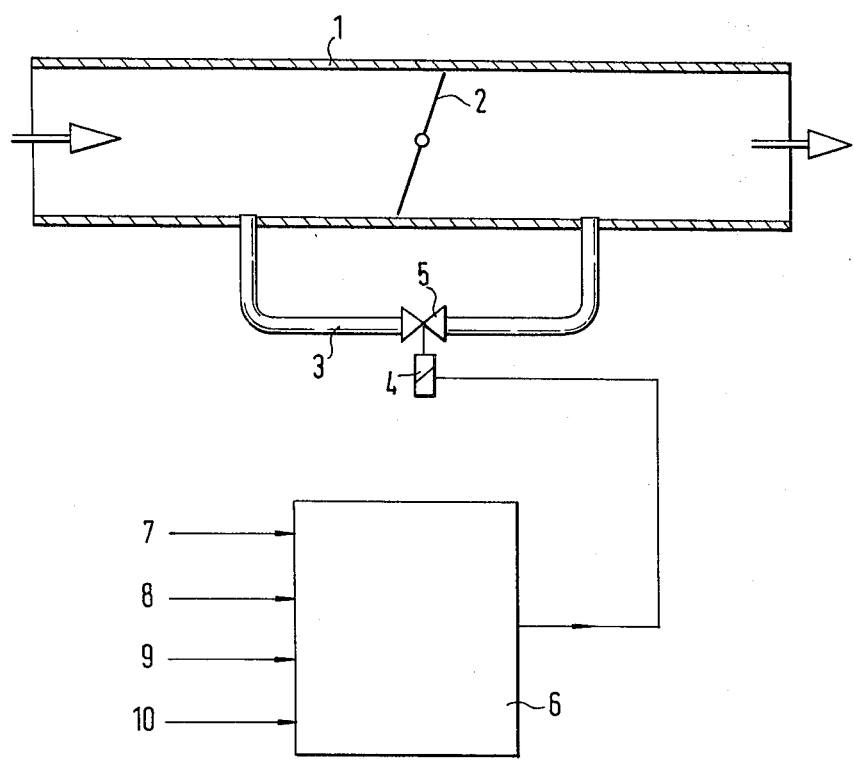
FIG. 1 shows a schematic arrangement of a device with a bypass to the throttle valve in the intake pipe of an internal combustion engine.

In FIG. 1 combustion air, for instance, flows in the direction of the arrows through an intake pipe 1, passing a throttle valve 2, and entering an internal combustion engine not shown. Connected to the intake pipe 1 is a bypass line 3 leading around the throttle valve 2, the passage diameter of which can be changed by means of a device 4, which activates a throttle element 5. The device 4 is controlled by an electronic control device 6, to which is fed the supply voltage at 7, the signal taken from the distributor in respect to the rpm of the internal combustion engine at 8, the motor temperature signal at 9 and, at 10, a voltage indicating the position of the throttle valve 2, which could be supplied by a potentiometer, such as shown in U.S. Pat. No. 4,322,947.

Figure 2:
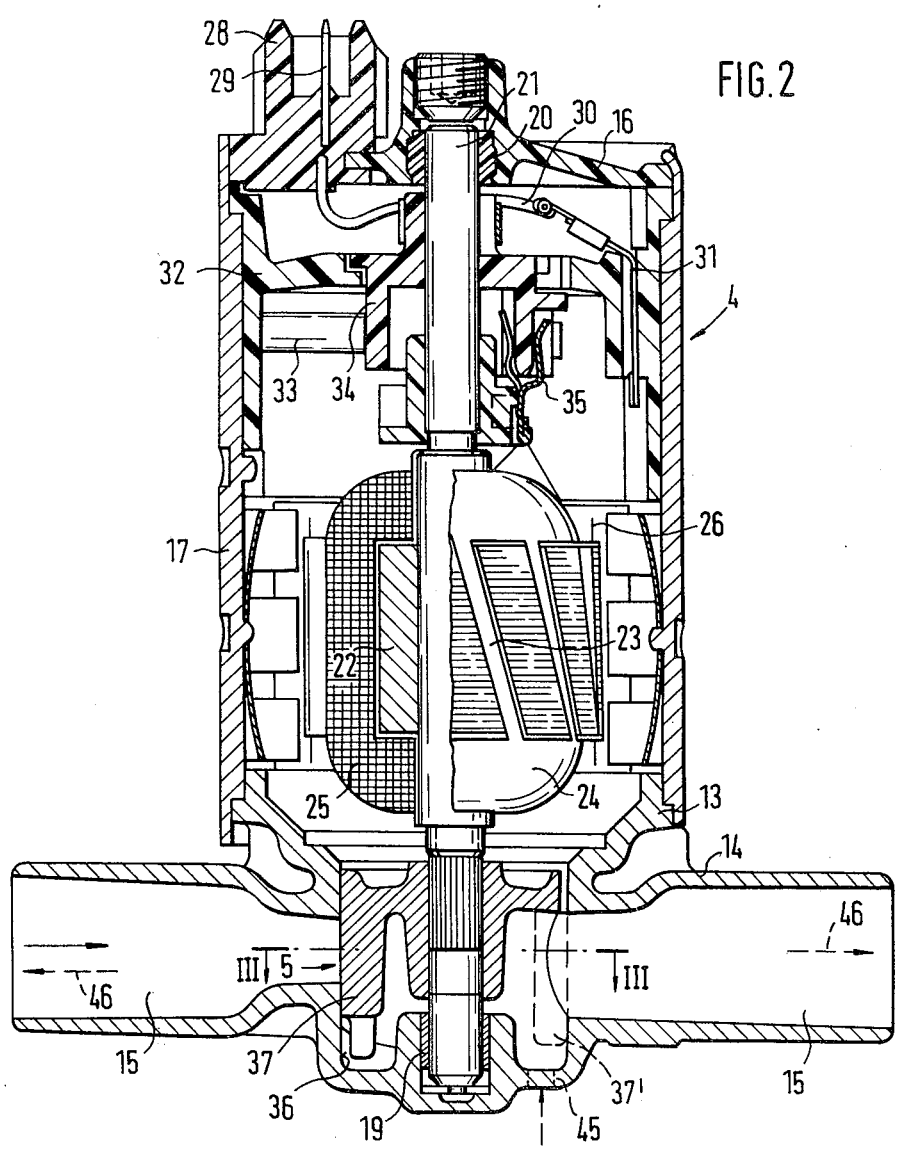
FIG. 2 shows a section through a device for the control of at least one throttle diameter.

The device 4, shown in section in FIG. 2, is equipped with a cover 13 which axially delimits the device on one side and which is formed as a casting with a part 14 of the bypass line 3 surrounding the corresponding part of the bypass 15. The side of the device 4 facing away from the cover 13 is delimited by a connecting cover 16. A pipe-like housing 17 forms the connection between the cover 13 and the connecting cover 16. In a sliding sleeve 19 of the part 14 of the bypass line and, on the other side, in a sliding sleeve 20 of the connecting cover 16 an axle 21 is rotationally disposed, with which an armature 22 of the control motor of the device is rigidly connected. In another form of embodiment the axle 21 could be pressed into the covers 13, 16, around which the armature 22 could be rotatably disposed. In the grooves 23 of the armature 22 two windings 24, 25, offset by 90° from one another and acting in opposite directions, are disposed in order to generate a reversible 90° rotational movement. Both windings 24, 25 are controlled in a known manner by the control device 6 by means of current impulses of a variable, mutually assigned scanning rate, so that the armature 22 assumes a position in the magnetic field formed by the two segment-like permanent magnets 26 corresponding to the scanning rate. The electrical connection of the device 4 is made via a plug 28 with three plug junctions 29. The plug junctions 29 are connected with stranded wire 30 to plugs 31 at the periphery of an insulated support 32, which is disposed non-rotatingly in the housing 17. A flexible conductor loop 33 each is connected with the three plugs 31 offset by 120° from one another, the loops leading in a radial direction to a coil 34, where they are touched by a fork-like contact shoe 35. The coil 34 is fixed to the axle 21. The contact shoes 35 are connected on their other end to the ends of the windings 24, 25. Because of the clocked control of the control device frictional resistance is reduced.

The throttle element 5, formed as a rotary slide, is fixedly connected to the armature 22, for instance by means of the axle 21, and penetrates the cover 13 and the bypass 15 inside a control bore 36 with a circle segment-like control section 37. The control section 37 opens to a larger or lesser degree the bypass 15, depending on the position of the rotary slide 5.

FIG. 3 shows in a simplified manner a section along the line III—III of FIG. 2. In the area of the section the bypass 15, serving as a control line, forms a throttle diameter 39 together with the control bore 36, which is surrounded by a circularly arched sealing surface 40 forming a part of the control bore 36, but offset from the latter in the direction towards the control section 37 and having a different radius of arc. In accordance with the present invention the circular arch of the sealing surface 40 runs excentrically to the center line M of the axle 21. The circular sealing surface 40 has a radius R beginning at a center line $M_D$ lying on a circular arc 41 with a radius e around the center line M. The center line $M_D$ of the sealing surface 40 is fixed and, in the example shown in FIG. 3, lies to the left of the central plane running through the bypass 15 and the center line M and above the center line M. The radius R of the sealing surface 40 is smaller than the distance from the center line M to the control bore 36 outside of the sealing surface 40. In accordance with the present invention the circle segment-like control section 37 should also be placed eccentrically to the center line M, wherein its circumference 42 has the same radius R as the sealing surface 40. The center line $M_S$ of the control section 37, from which the radius R of the circumference 42 starts, also lies on the circular arc 41 with the radius e around the center line M and is pivotable around the center line M. In a position of the control section 37 which closes the throttle diameter 39 and shown by broken lines, the center line $M_D$ of the sealing surface 40 and the center line $M_S$ of the control section 37 should correspond. This means that in this position the control section 37 lies snugly against the sealing surface 40, so that no flow can take place through the throttle diameter 39. During a turn of the control section 37 counterclockwise in order to open the throttle diameter to a larger or lesser degree, the radial distances between the circumference 42 of the control section 37 and the sealing surface 40 constantly increases. The construction according to the present invention assures a tight sealing of the device in the closed state as well as assuring that the device is impervious to dirt, since the respective operating surfaces of the control section 37 and the sealing surface 40 effect together a scissoring action which continually wipes free any particles of dirt or impurities that may collect on either operating surface.

As shown by broken lines in FIG. 2, an additional control section 37' could be embodied symmetrically with the axle 21 and could be fixedly coupled with the control section 37 and work together with a further sealing surface. It would be practical to have the medium to be controlled flow between the two control sections 37, 37' via a bore 45, and to have it run off in the direction shown by the arrows 46, then the device is opened.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A device for the control of at least one throttle diameter in a control line, especially in a line carrying fuel for an internal combustion engine, having at least one circle segment-like control section in a control bore intersecting the control line, the control section being pivotable around an axle and controlling to a larger or lesser degree the throttle diameter formed by the intersection of the control line and control bore, wherein the control bore (36) comprises a circularly arched sealing surface (40) surrounding the throttle diameter (39), the circle segment-like control section (37) and the arched sealing surface (40) both having a radius extending eccentrically to the axle (21), whereby the radial distance(s) between the circumference of the control section (37) and the circumference of the sealing surface (40) is a finite distance when the control section (37) is in a position opening the throttle diameter (39), and approaches zero when the control section (37) is in a position closing the throttle diameter (39).

2. A device in accordance with claim 1, wherein the radii (R) of the circularly arched sealing surface (40) and of the circumference of the circle segment-like control section (37) are less than the distance from the center line (M) of the axle (21) to the periphery of the control bore (36) outside of the sealing surface (40).

3. A device in accordance with claim 2, wherein the radii (R) of the circularly arched sealing surface (40) and of the circumference (42) of the circle segment-like control section (37) are equal.

4. A device in accordance with claim 3, wherein the radius (R) of the circularly arched sealing surface (40) proceeds from a center line ($M_D$) and the radius (R) of the circumference (42) of the circle segment-like control section (37) from the center line ($M_S$), whereby the center line ($M_D$) and the center line ($M_S$) lie on the same circular arc (41) having a common radius (e) to the center line (M) of the axle (21).

5. A device in accordance with claim 4, wherein when the control section (37) closes the throttle diameter (39), the center line ($M_S$) of the control section (37) coincides with the center line ($M_D$) of the sealing surface (40).

6. A device in accordance with claim 5, further comprising a pair of circularly arched sealing surfaces arranged symmetrically to the axle (21), one each circularly arched sealing surface (40) surrounding the throttle diameter (39) and disposed eccentrically to the axle (21), and a control section (37,37') acting together with each sealing surface (40).

7. A method for controlling the flow of a fluid through a throttle diameter surrounded by a circularly arched sealing surface in a control line for carrying fuel in an internal combustion engine having a control section in a control bore intersecting the control line and controlling to a larger or lesser degree the throttle diameter formed by the intersection of the control line and the control bore, comprising the step of, passing the control section over the sealing surface through an arc that converges with the arc defining the sealing surface, whereby the distance between the surface of the control section and the sealing surface approaches zero when the control section is in a position closing the throttle diameter.

* * * * *